2,910,493
HYDROXY-, ALKOXY-ALUMINUM SALTS OF ALIPHATIC AMINO ACIDS

Jacobus Rinse, Bernardsville, and Theodorus Morel, Basking Ridge, N.J., assignors to J. W. Ayers & Co., Easton, Pa., a corporation of Delaware No Drawing. Application December 28, 1955
Serial No. 555,784

4 Claims. (Cl. 260—448)

This invention relates to certain hydroxy-, alkoxy-aluminum salts of aliphatic amino acids and their thermal polymerization products and to a method of preparing such substances.

Basic dihydroxy aluminum salts of certain low molecular, water soluble, amino acids of the formula $$Al(OH)_2.O.CO.CHR.NH_2$$

more particularly, those of aminoacetic acid (glycine) are known. These dihydroxy aluminum salts have been disclosed as particularly well adapted for use as acid-binding or antacid agents. Such known dihydroxy aluminum salts are produced by reacting an aqueous solution of the amino acid with an aluminum alcoholate.

Also in the copending application Serial No. 495,765, filed March 21, 1955, by Jacobus Rinse, one of the inventors hereof, a process is disclosed for producing hydroxy-, alkoxy-aluminum salts of fatty acids. The process involves, firstly, forming a liquid mixture of approximately molar quantities of an appropriate alcoholate and a fatty acid and heating the mixture to a reaction temperature which vaporizes off the hydroxy compound formed as a by-product of the reaction and thereby form di-alkoxy- or diphenoxy-aluminum salts of the fatty acid; and, secondly, adding water to the first formed reaction product in an approximately molar proportion to form the corresponding hydroxy-, phenoxy- or hydroxy-, alkoxy-aluminum salts of the fatty acid.

It is an important object of this invention to provide novel aluminum salts of amino acids and their thermal polymerization products which have superior antacid or acid-binding properties.

It is a special object of the invention to provide an efficient and practicable process for the preparation of the novel aluminum salts of this invention.

Other objects of the invention will become apparent from the following description.

It has now been found that monohydroxy-, alkoxy aluminum salts of certain low molecular aliphatic amino acids and their thermal polymerization products have substantially higher acid-binding capacity than dihydroxy aluminum salts of the corresponding acids and that such compounds are not satisfactorily produced by either of the methods discussed above. For example, reaction of the alcoholates with aqueous solutions of the amino acids will produce the inferior dihydroxy aluminum salts. On the other hand, alcoholates, such as aluminum isopropoxide, cannot be reacted advantageously with amino acids, such as glycine, in the same manner as such alcoholates are reacted with fatty acids, i.e. in the molten form or in a mutual solvent. For instance, there is no known available satisfactory mutual organic solvent for the glycine and aluminum isopropoxide and any effort to induce glycine to a melt at its relatively high melting point of 232° C. results in a substantial decomposition and resulting loss of the glycine.

Thus, in accordance with this invention, it has been found that an alcoholate can be dissolved in an aromatic solvent and reacted with an alcoholic suspension of a low molecular aliphatic amino acid in a molar ratio of about 1:1 to produce the corresponding mono-aluminum salt of the amino acid. The aliphatic amino acids have a very limited solubility in the alcohol diluent or extender but the resulting dialkoxy-aluminum salts of the amino acids have a good solubility in the aromatic solvent. In this way a good conversion of the alcoholate into the di-alkoxy-aluminum salts of the amino acid is obtained. The formed dialkoxy-aluminum salts of the amino acid may be recovered by evaporating off the aromatic solvent and the alcohol used to disperse amino acid. This intermediate product can be redissolved in an aromatic solvent and reacted with water in a molar ratio of approximately 1:1 to give the corresponding hydroxy-, alkoxy-aluminum salts of the amino acids. In the alternative, the water may be added to the reaction mass obtained in the first conversion step in the desired molar proportions to provide the hydroxy-, alkoxy-aluminum salts of the amino acids. In either instance, however, the hydroxy-, alkoxy-aluminum salts of the amino acids can be converted into thermal condensation, or polymerization products, by heating them at temperatures higher than those necessary for the production of the monomeric material in order to liberate additional alcoholic hydroxy compounds and thereby induce polymerization.

In accordance with an important feature of the invention the aromatic solvent, the alcohol diluent, and the alcohol of the alcoholate all are vaporizable at a temperature below the decomposition temperature of the produced aluminum salts of the amino acids. Aromatic solvents meeting this requirement include benzene, toluene, and somewhat less desirably, xylene. The preferred alcohol diluent corresponds to the alcohol of the alcoholate and includes such alcohols as ethanol, n-propanol, isopropanol, n- and isobutanol, pentanol and the like.

In general, aluminum isopropoxide is the preferred alcoholate reactant but other aluminum alkoxides, derived from lower molecular alkanols such as those mentioned above as diluents may be used. Molar proportions of reactants and temperatures used in the reactions of this invention closely parallel those used in said copending application. For example, the initial reaction can be carried out at temperatures below 70–80° C. while completion of the reaction and drying of the reaction product may require temperatures up to 100° C. and higher together with the application of a vacuum. Generally, even higher temperatures, say 150–160° C. and higher, are required to produce the thermal polymerization products hereof.

Although the reactants are reacted preferably in a molar ratio of approximately 1:1 some leeway must be allowed. For instance, the dialkoxy-aluminum salts of the amino acids of this invention may be reacted with water in a molar ratio of about 1:0.7–1.1 and yet obtain products having excellent acid-binding capacities.

The reactions of this invention may be illustrated by the following equations giving the reactions considered to be involved in the production of hydroxy- isopropoxy-aluminum glycinate and its heat polymerization product:

(1) $Al \cdot (O \cdot C_3H_7)_3 + NH_2CH_2COOH \rightarrow$
$Al(OC_3H_7)_2 \cdot O \cdot CO \cdot CH_2NH_2 + C_3H_7OH$ (2) $Al \cdot (O \cdot C_3H_7)_2 \cdot O \cdot CO \cdot CH_2 \cdot NH_2 + H_2O \rightarrow$
$HO \cdot Al \cdot (O \cdot C_3H_7) \cdot O \cdot CO \cdot CH_2 \cdot NH_2 + C_3H_7OH$

3.

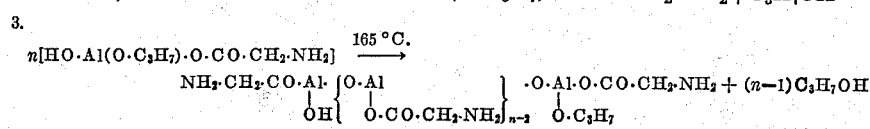

The following examples will further illustrate the invention.

Example 1

Aluminum isopropoxide in a quantity of 204 g. (1.0 mol) was dissolved in 400 ml. of dry, purified benzene in a reflux condenser. Glycine in a quantity of 75 g. (1.0 mol) and 200 ml. isopropanol was added to the resulting solution. The milky liquid obtained was stirred and gently boiled for 4½ hours at a temperature of about 75° C. after which the liquid body had become more transparent. The solvents were distilled off, first at atmospheric pressure until a paste was formed, and later by the application of a vacuum to the reaction mass. The temperature inside the reaction flask was not allowed to exceed 100° C.

The di-isopropoxy aluminum amino-acetate was obtained as a free flowing, fine crystalline powder. The substance is partially soluble in isopropanol, slightly soluble in hexane, and freely soluble in benzene and toluene.

The yield was 212.8 g. while the theoretical yield was approximately 219.0 g. The apparent loss of about 6 grams was mainly due to the reaction with moisture from air, leaking through during the heating under a vacuum. A very small amount of the light material dusted in the distilling head and cooler.

The di-isopropoxy aluminum aminoacetate, as obtained above, was dissolved again in 400 ml. benzene at 60° C. A mixture of 16.2 g. water and 100 ml. isopropanol was added to this solution. (The amount of water was calculated by subtracting the amount equivalent to the loss of 6.2 g. isopropanol from the theoretical vlaue.) The liquid mixture was heated and the solvents distilled off, first at atmospheric pressure until the reaction mass became thick, then under the application of a vacuum. The inside temperature during the drying was maintained between 75° C. and 80° C. The end of the reaction could be observed when the product had turned to a dusty, free flowing powder.

The hydroxy-, isopropoxy-aluminum aminoacetate is inslouble in isopropanol and conventional hydrocarbon solvents.

A yield of 177.6 g. was obtained while the theoretical yield is 177 g. The aluminum content of the reaction product was 16.1% while theoretically it should be 15.3%.

The hydroxy-, isopropoxy aluminum glycinate of this example in a quantity of 1 g. neutralizes 168 ml. 0.1 N HCl to a pH of 3.8 while 1 g. of dihydroxy aluminum glycinate is disclosed as neutralizing only 152.7 ml. of 0.1 N HCl to a pH of 3.8.

An equal quantity of hydroxy-, isopropoxy aluminum glycinate, as obtained above, was heated in a liquid bath under stirring at 165° C. at atmospheric pressure for one hour and then heated an additional half hour with the application of a vacuum.

A yield of 145.2 g. of a solid thermal polymerization product was obtained with a loss of 32.4 g. isopropanol.

The total loss of isopropanol calculated on aluminum isopropoxide, was 151.8 g. which equals 2.53 mol.

The polymeric substance is insoluble in isopropanol and hydrocarbon solvents and contains 19.8% aluminum.

The thermal polymerization product of the hydroxy-, isopropoxy glycinate in a quantity of 1 gram neutralizes 202 ml. of 0.1 N HCl to a pH of 3.8.

Example 2

About 400 ml. of liquid was distilled off from a liquid reaction mass obtained by boiling 204 g. aluminum isopropoxide 75 g. glycine 400 ml. benzene and 200 ml. isopropanol for 4½ hours, as described in Example 1. A solution of 18 g. water in 100 ml. isopropanol was added to the thick residue with vigorous stirring. A white suspension was formed, which soon turned to a thick jelly-like mass which made stirring impossible. When the temperature of 75° C. was reached inside the reactor a vacuum was applied, which was gradually raised from 5 to 25 inches of mercury. The temperature inside the reactor during the drying, was maintained between 75° C. and 80° C.

The obtained hydroxy-, isopropoxy aluminum salt of the aminoacetic acid was a free flowing powder.

The hydroxy-, isopropoxy aluminum salt of the aminoacetic acid was then heated further and processed in exactly the same way as previously described in Example 1.

The yields in this example were about the same as in Example 1.

While the foregoing examples have related to the production of hydroxy-, isopropoxy-aluminum glycinate and its heat polymerization products, it will be apparent that other hydroxy-, lower molecular alkoxy-aluminum glycinates and their heat polymerization products may be produced in exactly the same manner by substituting in the process of the examples the previously mentioned aluminum alkoxides for the aluminum isopropoxide.

It will be understood that the present invention is not limited to the specific examples given herein but that it extends to all equivalents which will occur to those skilled in the art upon consideration of the general teachings of the invention as described herein and as defined by the appended claims.

What is claimed is:

1. A hydroxy-, lower molecular alkoxy-aluminum glycinate, the mol ratio of the three substituents on the aluminum atom being substantially 1:1:1.

2. Hydroxy-, isopropoxy-aluminum glycinate, the mol ratio of the three substituents on the aluminum atom being substantially 1:1:1.

3. The thermal polymerization product of hydroxy-, isopropoxy-aluminum glycinate, the mol ratio of the three substituents on the aluminum atom being substantially 1:1:1.

4. The thermal polymerization product of hydroxy-, low molecular alkoxy-aluminum glycinate, the mol ratio of the three substituents on the aluminum atom being substantially 1:1:1.

References Cited in the file of this patent

UNITED STATES PATENTS

| 2,744,074 | Theobald | May 1, 1956 |

FOREIGN PATENTS

| 519,092 | Belgium | Apr. 30, 1953 |

OTHER REFERENCES

Eigenberger: "Fette and Seifen," July 1942, vol. 49, pp. 505–8.

Krantz et al.: The Journal of Pharmacology and Experimentation, vol. 82, November 1944, pp. 247–8.

UNITED STATES PATENT OFFICE

CERTIFICATE OF CORRECTION

Patent No. 2,910,493                                    October 27, 1959

Jacobus Rinse et al.

It is hereby certified that error appears in the printed specification of the above numbered patent requiring correction and that the said Letters Patent should read as corrected below.

Columns 1 and 2, equation 3, second line thereof, for that portion reading "$NH_2 \cdot CH_2 \cdot CO \cdot Al \cdot$" read — $NH_2 \cdot CH_2 \cdot CO \cdot O \cdot Al \cdot$ —.

Signed and sealed this 3rd day of May 1960.

(SEAL)
Attest:

KARL H. AXLINE                                                ROBERT C. WATSON

Attesting Officer                                             Commissioner of Patents